(12) United States Patent
York

(10) Patent No.: US 6,555,944 B1
(45) Date of Patent: Apr. 29, 2003

(54) DEFLECTION RESISTING ROTOR ASSEMBLY

(75) Inventor: Michael T. York, Chelsea, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 27 days.

(21) Appl. No.: 09/710,587

(22) Filed: Nov. 9, 2000

(51) Int. Cl.$^7$ .............................................. H02K 19/22
(52) U.S. Cl. ...................................................... 310/263
(58) Field of Search ................................ 310/263, 271, 310/270

(56) References Cited

U.S. PATENT DOCUMENTS

| | | | | |
|---|---|---|---|---|
| 829,015 A | * | 8/1906 | Johnson ........................ | 310/263 |
| 3,445,694 A | * | 5/1969 | Campbell et al. ............ | 310/263 |
| 5,483,116 A | * | 1/1996 | Kusase et al. ................. | 310/263 |
| 5,543,676 A | | 8/1996 | York et al. ..................... | 310/263 |
| 5,903,083 A | | 5/1999 | Mukai et al. .................. | 310/263 |
| 5,903,084 A | | 5/1999 | Asao et al. ..................... | 310/263 |
| 6,037,695 A | * | 3/2000 | Kanazawa et al. .......... | 310/263 |

FOREIGN PATENT DOCUMENTS

| | | | | |
|---|---|---|---|---|
| DE | 1 917 470 | * | 11/1969 | ................... 310/263 |
| EP | 651 494 | * | 3/1995 | ................... 310/263 |
| EP | 0 651 494 A2 | | 5/1995 | ............ H02K/1/24 |
| GB | 2 316 241 A | | 2/1988 | ............ H02K/1/24 |
| GB | 2 205 693 A | | 12/1988 | ............ H02K/1/08 |
| GB | 2 307 110 A | | 5/1997 | ............ H02K/1/27 |
| JP | 1318532 | | 12/1989 | .......... H02K/19/24 |
| JP | 6-78479 | * | 3/1994 | ............ H02K/1/24 |
| SU | 692-003 | * | 10/1979 | ................... 310/263 |

OTHER PUBLICATIONS

Search report in a corresponding Great Britain Application No. GB 0124660.2 from United Kingdom Patent Office dated Feb. 21, 2002, 4 pages.

* cited by examiner

*Primary Examiner*—Karl Tamai
(74) *Attorney, Agent, or Firm*—Brinks Hofer Gilson & Lione

(57) ABSTRACT

An axially turnable rotor for an electric generator. In one embodiment, a rotor coil is encased within two pole piece members each having a plurality of flanged magnetic poles extending from a flat base face. Each of these flanged magnetic poles has a retaining structure on the opposite end from the flat base face. In the preferred embodiment of the invention, this retaining structure takes the form of a subflange. When the two pole piece members are meshed together around the rotor coil, the subflanges of each pole piece member extend beyond the flat base face of the opposing pole piece member, allowing for the introduction of a ring or other securing means upon the subflanges.

23 Claims, 11 Drawing Sheets

DEFLECTION RESISTING ROTOR ASSEMBLY

FIELD OF THE INVENTION

This invention relates generally to the field of rotors for use in electric generators and motors. In particular, the invention relates to electric dynamo rotor assemblies having multiple magnetic poles mounted thereon.

DESCRIPTION OF THE RELATED ART

Rotors in the past have utilized a field core assembly consisting of two pole piece members with triangular magnetic poles alternatively meshed together. This core assembly covers a rotor coil through which current is passed to generate magnetic flux. The stator and stator coil generate an alternating current as the rotor spins within a field of magnetic flux. The stator is in a position where there is a spatial gap radially between the rotor and the stator.

As is well known by those skilled in the art, it is beneficial to the electrical output of the generator if the spatial gap between the rotor and the stator is kept as small as possible. However, due to the magnetic and centrifugal forces on the pole piece members, they tend to deform in an outward direction during rotation, possibly coming into contact with the stator as the deformation bridges the spatial gap. Contact with the stator is undesired because it hinders the rotation of the rotor and can possibly damage the stator, the poles or both. Even slight damage can compromise the rotational balance of the rotor, thereby causing vibration and various other harmonically induced forces that can further damage the rotor or surrounding componentry. In order to avoid this contact, the spatial gap can be increased, thus reducing the output of the electrical machine.

U.S. Pat. No. 5,903,084 attempted to solve this problem by placing magnets between adjacent triangular poles, which prevented some flux leakage, and placing non-magnetic tape or banding around the outer periphery of the rotor assembly. This solution had its own shortcomings, in that some deformation still occurred. Also, in this position, the tape or banding had to be made of an expensive, non-magnetic material to prevent flux leakage from the opposing pole pieces of the rotor assembly. Furthermore, the additional material around the circumference of the rotor was placed in a groove cut in all of the pole pieces. This groove added to the gap space between the rotor and the stator, resulting in a reduction in output power of the electrical machine.

BRIEF SUMMARY OF THE INVENTION

The present invention provides, in one embodiment, an axially turnable rotor for an electric generator. A rotor coil is encased within two pole piece members each having a plurality of flanged magnetic poles extending from a flat base face. Each of these flanged magnetic poles has a retaining structure on the opposite end from the flat base face. In the preferred embodiment of the invention, this retaining structure takes the form of a subflange. When the two pole piece members are meshed together around the rotor coil, the subflanges of each pole piece member extend beyond the flat base face of the opposing pole piece member, allowing for the introduction of a ring or other securing means upon the subflanges. In a further embodiment of the present invention, a plurality of permanent magnets is positioned under at least one of the flanged magnetic poles.

In another embodiment of the present invention, only one pole piece member is used, and it completely encases the rotor coil by itself.

The invention may also be embodied in a method for preventing the outward deflection of the flanged magnetic poles of the pole piece members during the rotation of the rotor. The method includes the steps of providing retaining structures on the ends of the flanged magnetic poles and securing the flanged magnetic poles by attaching a ring-shaped securing means to these retaining structures. In the preferred embodiment of the invention, the retaining structures take the form of subflanges. The securing means may also include fasteners or brackets. In yet a further embodiment of the method, the securing means may be secured to the subflanges by an adhesive, by cutting a groove in the subflange to fit the securing means, or by bending the subflange up after placing the securing means on the subflange, thereby locking it in place.

The present invention provides a number of advantages over the prior art. The securing means prevents the outward deflection of the flanged magnetic poles during rotation. This keeps the flanged magnetic poles from contacting the stator. Since the outward deflection of the flanged magnetic poles is substantially reduced, the electric generator can be constructed in a manner leaving a very small spatial gap radially between the magnetic portions of the rotor and the stator. A smaller spatial gap results in increased output of the electrical machine.

Another advantage of the preferred embodiment of this invention is the fact that each securing means contacts only one of the two magnetic pole pieces. This means that they contact only one magnetic polarity, either North or South. Because of this feature, the magnetic flux leakage is kept to a minimum. This feature allows the use of both magnetic and non-magnetic materials for the securing means, which in turn provides the user with a broad range of material choices. This invention is also easier to manufacture than the prior art.

Yet another advantage of the present invention is the fact that each securing means is positioned outside of the spatial gap between the rotor and the stator. This avoids the prior art problem of cutting a groove in the circumference of the rotor, which would increase the spatial gap and decrease the output of the electrical machine.

It is to be understood that both the preceding summary and the following detailed description are intended to be exemplary and explanatory and are intended to provide a further explanation of the invention claimed. The invention will best be understood by reference to the following detailed description read in conjunction with the accompanying drawings.

BRIEF DESCRIPTION OF SEVERAL VIEWS OF THE DRAWINGS

These and other advantages of the present invention will become more fully apparent as the following description is read in conjunction with the drawings, wherein.

DETAILED DESCRIPTION OF THE PREFERRED EMBODIMENT

Figure 1:
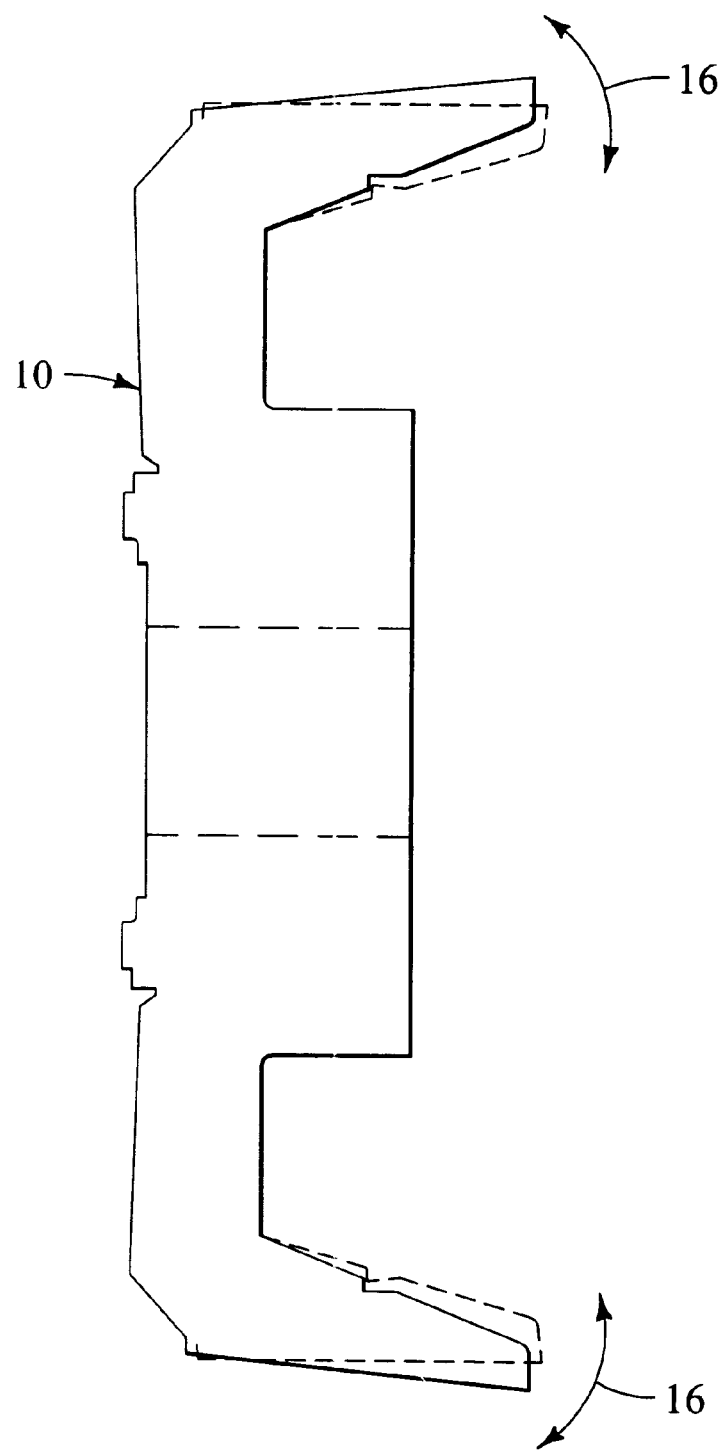
FIG. 1 shows the deflection of a prior art pole piece.
Figure 13:
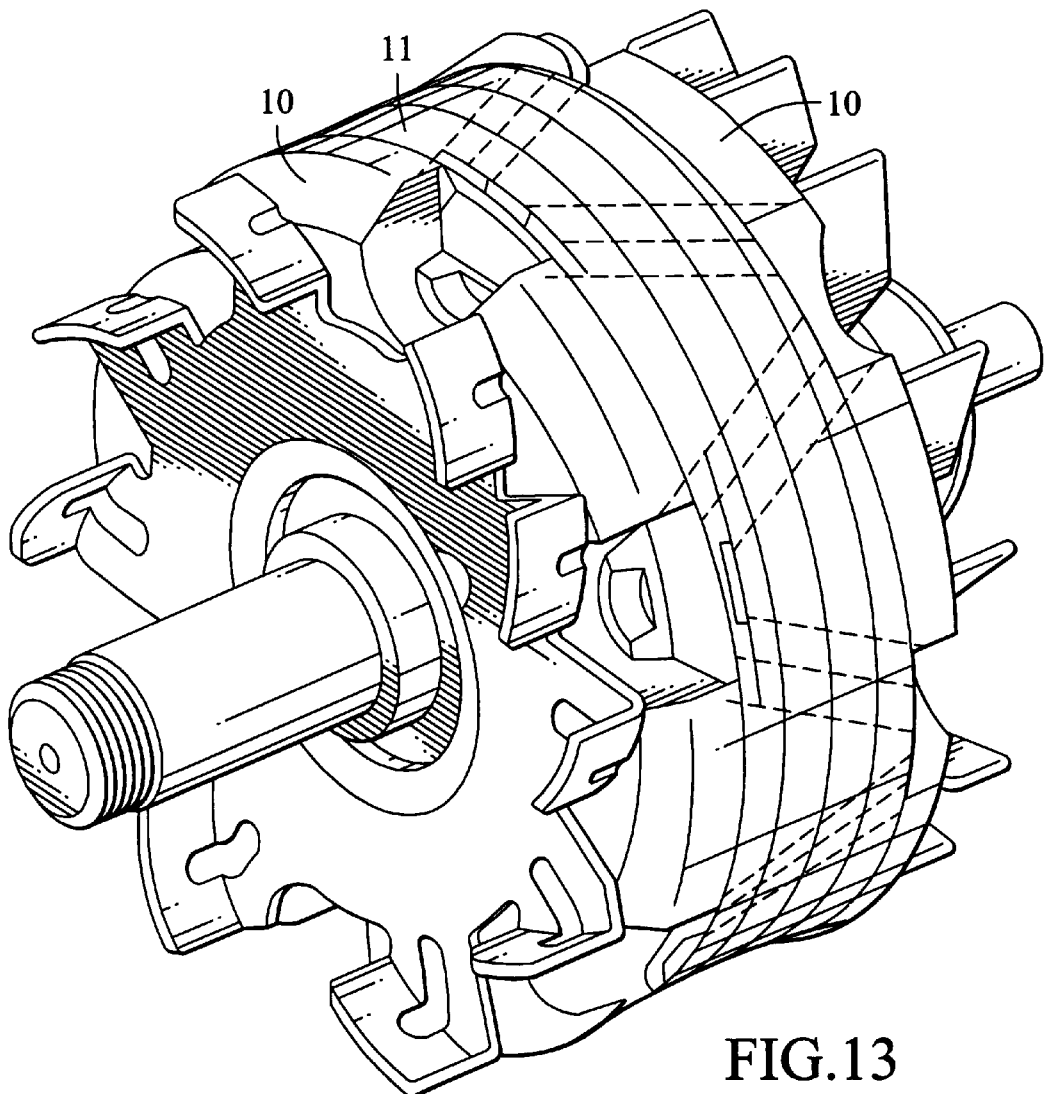
FIG. 13 shows a prior art rotor with tape secured around the circumference.

Referring to the figures, FIG. 1 shows a standard pole piece 10 known in the prior art. FIG. 13 shows a prior art rotor using the standard pole piece 10 and carbon-based tape 11 wrapped around the circumference of the rotor. During rotation, there is a magnetic attraction between a pole piece 10 of the rotor 14 and the stator 12. This attraction, along with the centrifugal force from the rotation, causes the pole piece 10 to deform in an outward direction shown by line 16, towards the stator 12. Eventually, this outward deformation can cause the rotor 14 to come in contact with the stator 12, causing damage to both the rotor 14 and the stator 12. In order to prevent this, a rotor construction using a pole piece 10 shown in FIG. 1 must have a wide enough spatial gap 19 so that any outward deformation does not cause the rotor 14 and the stator 12 to come in contact. This widening of the spatial gap 19 results in decreased output of the electrical machine.

One advantage to the present invention is that the securing means acts to prevent the outward deformation of the pole pieces 10 along the illustrated lines 16 during rotation. This allows the electric generator to be constructed with a smaller spatial gap 19 between the rotor 14 and the stator 12. The narrower the spatial gap 19, the greater the output of the electrical machine.

Figure 2:
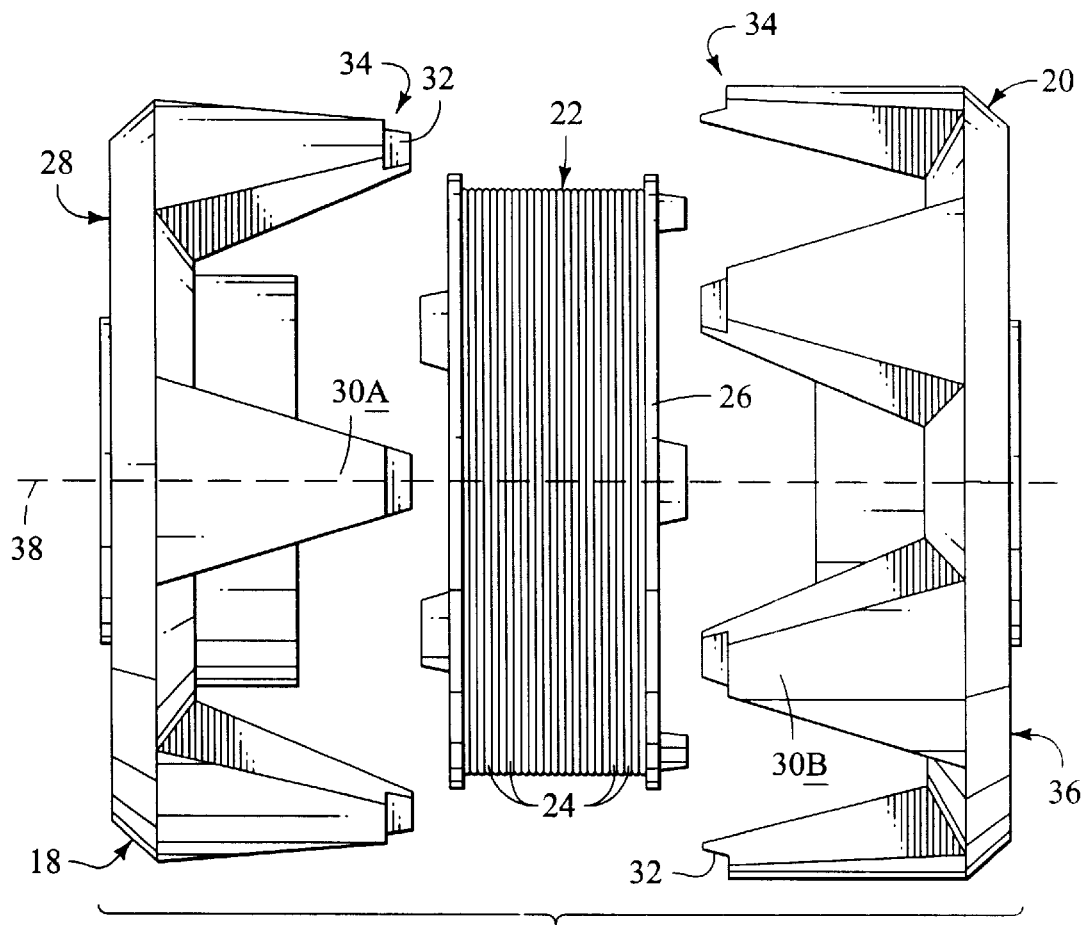
FIG. 2 is a side view of the pole pieces and field coil of the present invention in an unassembled state.

FIG. 2 shows a side view of the rotor 14 in an unassembled state. The figure also shows a first pole piece 18 and a second pole piece 20 as well as the field coil 22. The field coil 22 is preferably made up of a wire 24 wrapped continuously around a plastic bobbin 26. The first pole piece member 18 has a flat base face 28 that is preferably circular in shape and having a diameter extending generally radially from the turning axis 38 of the rotor 14 and a plurality of flanged magnetic poles 30A extending axially therefrom. The preferred shape of the flanged magnetic poles 30A is triangular. However, the shape of the flanged magnetic poles 30A can be adjusted as necessary. In the preferred embodiment of the invention, each flanged magnetic pole 30A has a retaining structure in the form of a subflange 32 defined on a distal end 34 of the flanged magnetic pole 30A. The second pole piece member 20 has a flat base face 36 that is preferably circular in shape and has a diameter extending generally radially from the turning axis 38 of the rotor 14 and a plurality of flanged magnetic poles 30B extending axially therefrom. The preferred shape of the flanged magnetic poles 30B is triangular. However, the shape of the flanged magnetic poles 30B can be adjusted as necessary. In the preferred embodiment of the invention, each flanged magnetic pole 30B has a retaining structure in the form of a subflange 32 defined on a distal end 34 of the flanged magnetic pole 30B.

Figure 3:
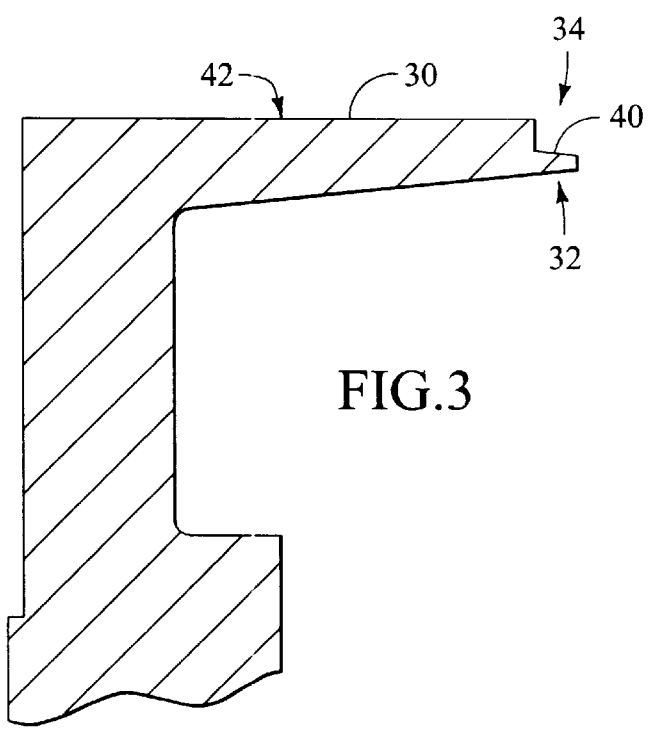
FIG. 3 is a close-up side view of a flanged magnetic pole of the preferred embodiment of the present invention, displaying a subflange.
Figure 4:
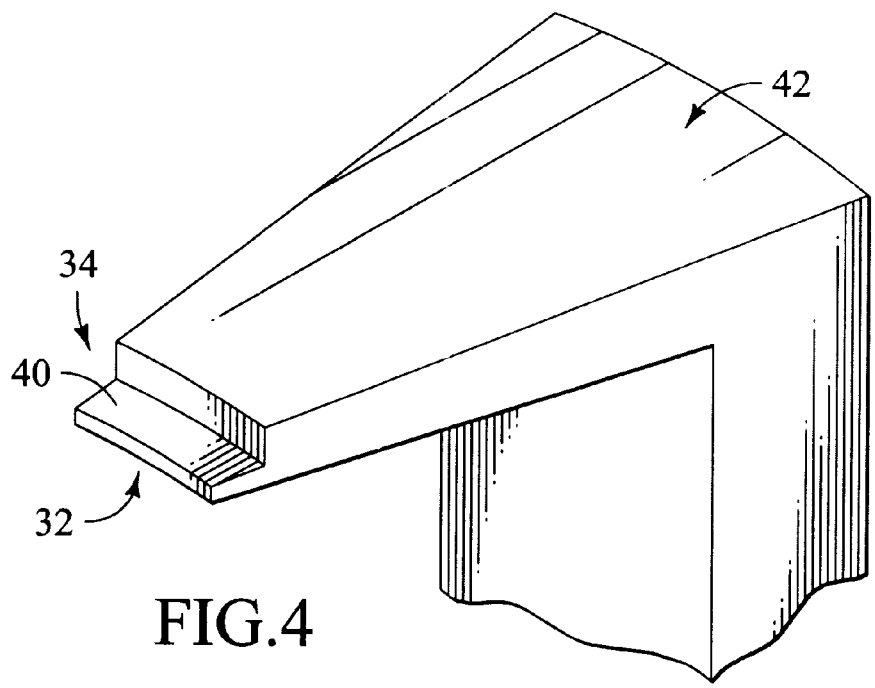
FIG. 4 is an enlarged, perspective view of a flanged magnetic pole and a subflange of the present invention.

FIG. 3 shows a side view of a flanged magnetic pole 30 and the subflange 32 defined thereon. FIG. 4 shows an enlarged, perspective view of the preferred embodiment of the invention with a subflange 32 as defined on the flanged magnetic pole 30 of either the first pole piece member 18 or the second pole piece member 20. Each of the subflanges 32 preferably includes a stepped section defining a ledge 40 facing radially outward. The subflanges 32 are preferably positioned at a lower point than the main body 42 of each of the flanged magnetic poles 30.

Figure 6:
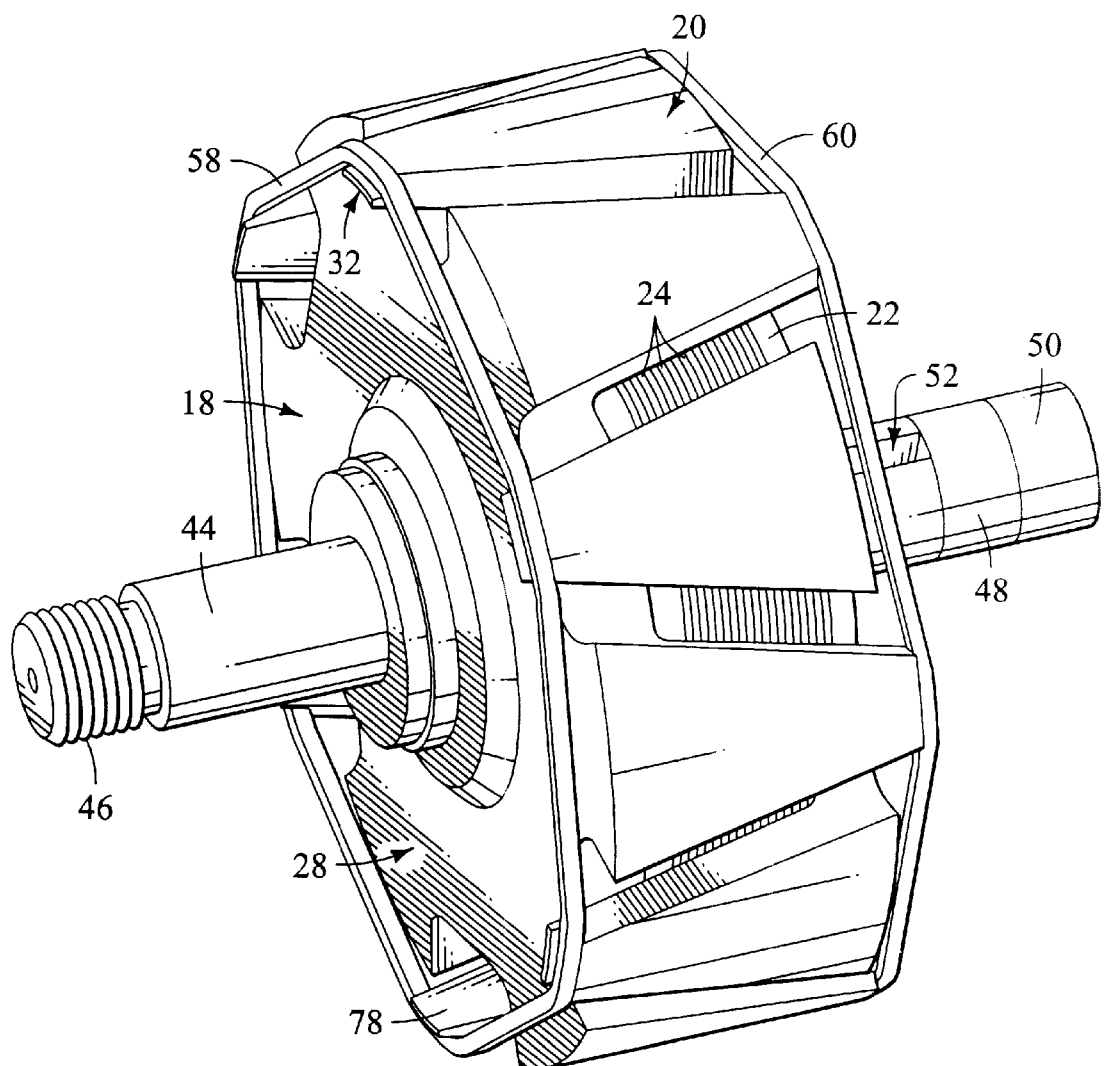
FIG. 6 is a view of a preferred embodiment of the invention showing the ring-shaped securing means of FIG. 6 in a mounted position.
Figure 7:
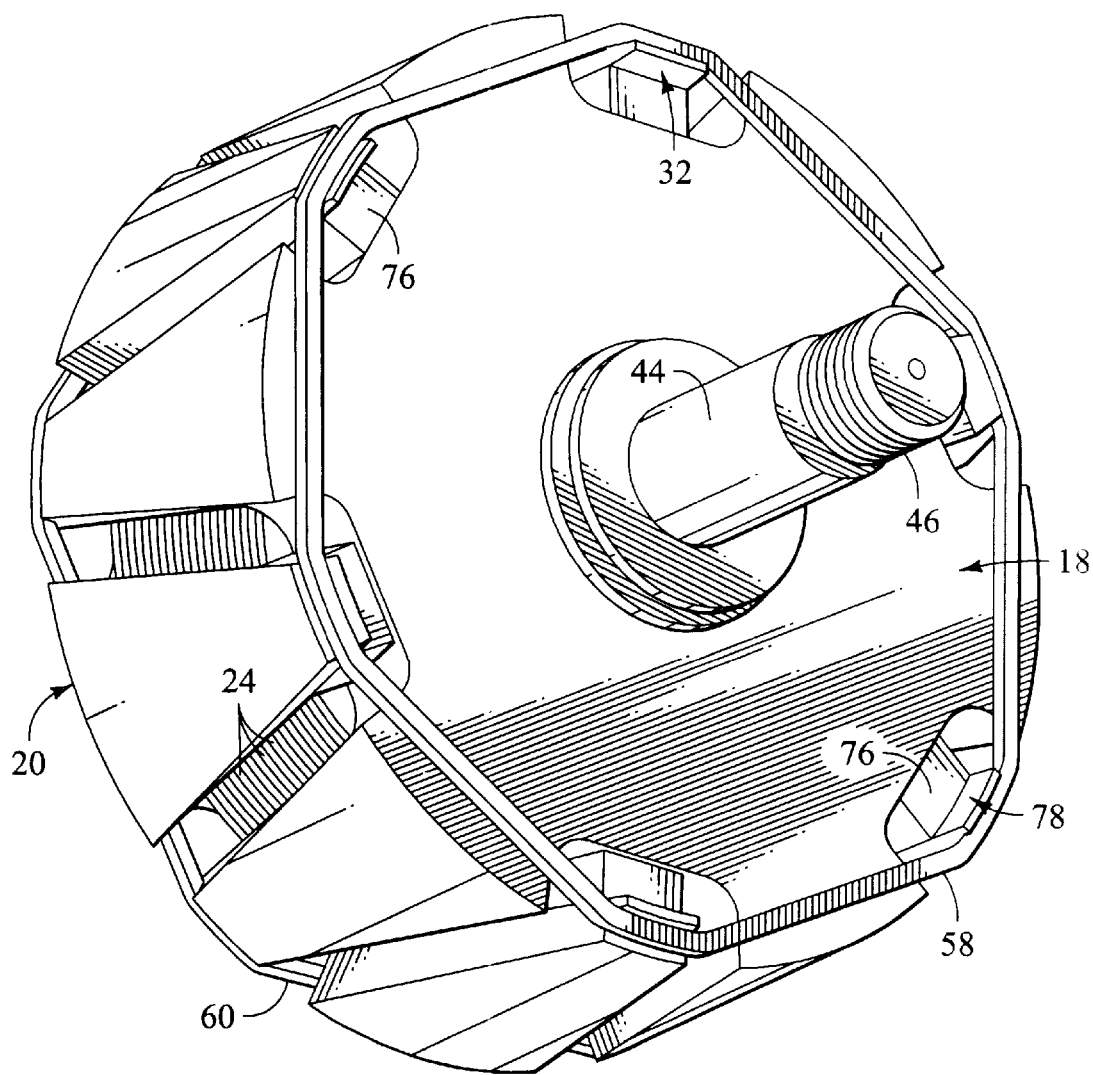
FIG. 7 is a view of another embodiment of the invention showing optional permanent magnets.
Figure 8:
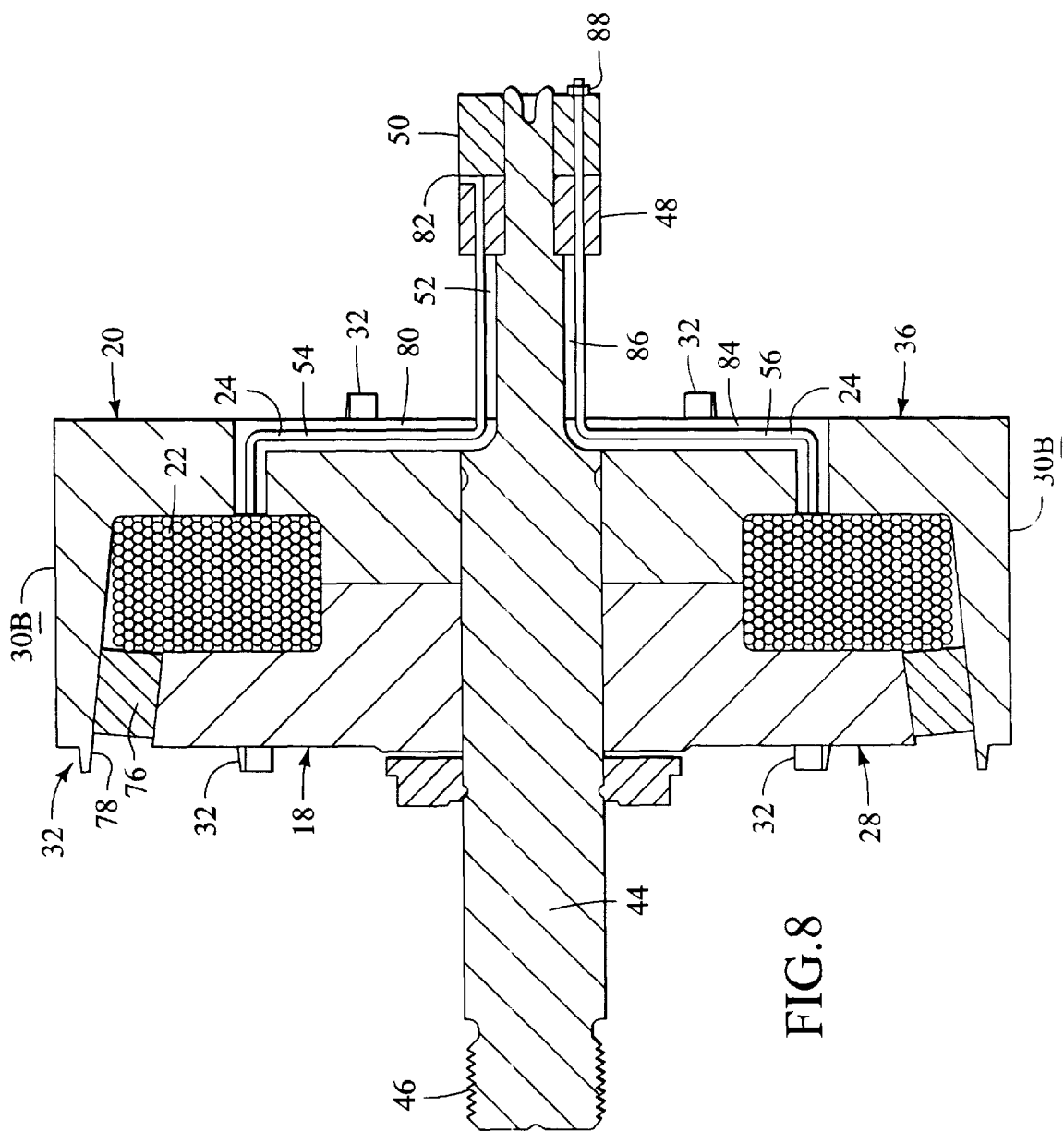
FIG. 8 is a cross-section of an alternate embodiment of the invention without a mounted securing means.

FIG. 6 and FIG. 7 show the rotor assembly in its assembled state. The first pole piece 18 and the second pole piece 20 are intermeshed together around the field coil 22. Preferably, the first pole piece 18 and the second pole piece 20 are mounted on a shaft 44 which has threads 46 at one end and upon which a first slip ring 48 and an adjacent second slip ring 50 are mounted at the opposite end. A groove 52 for the wire 24 is defined within the shaft 44 leading from the field coil 22 to the first slip ring 48. The wire 24 is shown in FIG. 8. The wire 24 supplies power to the field coil 22 to create the field of electromagnetic flux.

In the present embodiment in FIGS. 6 and 7, securing means in the form of a first ring 58 and a second ring 60 are mounted to the distal ends 34 of the flanged magnetic poles 30. In particular, the first ring 58 is preferably secured to the subflanges 32 of the flanged magnetic poles 30 of the second pole piece 20. The first ring 58 is mounted in such a way that it only contacts the second pole piece 20 and is raised slightly above the base face 28 of the first pole piece 18. The second ring 60 is mounted in such a way that it only contacts the first pole piece 18 and is raised above the base face 36 of the second pole piece 20. The space between the rings 58, 60 and each base face 28, 36 serves to substantially reduce the magnetic flux leakage between the rings 58, 60 and the base faces 28, 36. Other types of securing means, such as brackets or fasteners, may be used to fixedly secure the individual flanged magnetic poles 30 of one or both of the pole pieces 18, 20.

It is important to note that the shape of the securing means can vary, so long as it resists the outward deformation of the pole pieces 18, 20. For example, the securing means can comprise a series of arcuate rings to secure one or more flanged magnetic poles 30 together in a substantially rigid fashion to one or more other poles 30. Such fixation constrains the distal ends 34 of the pole pieces 18, 20 and thereby substantially hinders deformation of the flanged magnetic poles 30 due to centrifugal and magnetic forces.

Figure 5:
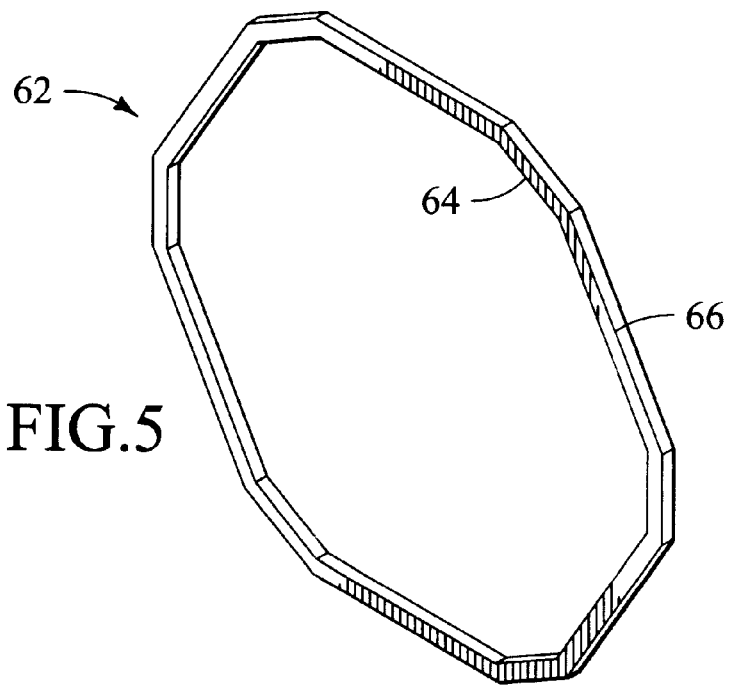
FIG. 5 is a view of an embodiment of a ring-shaped securing means of the present invention, unmounted.

FIG. 5 shows the securing means in the preferred form of a ring 62 in a non-mounted state. The preferred embodiment of the ring 62 has a plurality of flattened portions of differing lengths. The smaller flattened portions 64 are arranged such that they may come into contact with the subflanges 32 on the flanged magnetic poles 30 of only one pole piece member 18, 20. The larger flattened portions 66 are arranged such that they may be positioned between the subflanges 32 of the pole piece member 18, 20 upon which the ring 62 is mounted. It is important to note that the ring 62 could be constructed without the larger flattened portions 66, instead having arc-shaped larger portions at the expense of the strength of the ring 62. The preferred embodiment described above results in a more rigid support because of the larger flattened portions 66.

Figure 3A:
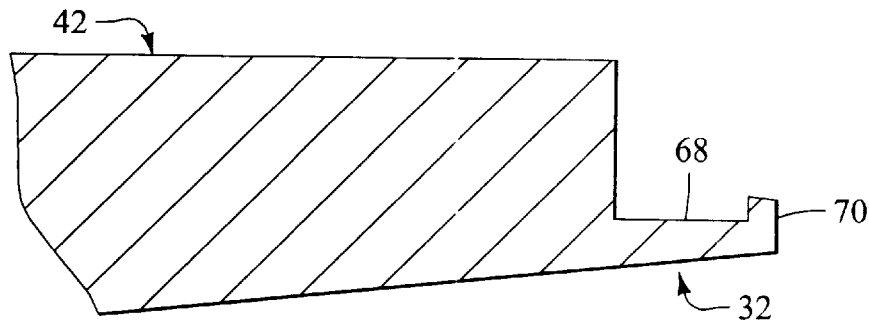
FIG. 3A is a close-up side view of the subflange shown in FIG. 3, displaying a mounting groove.
Figure 3B:
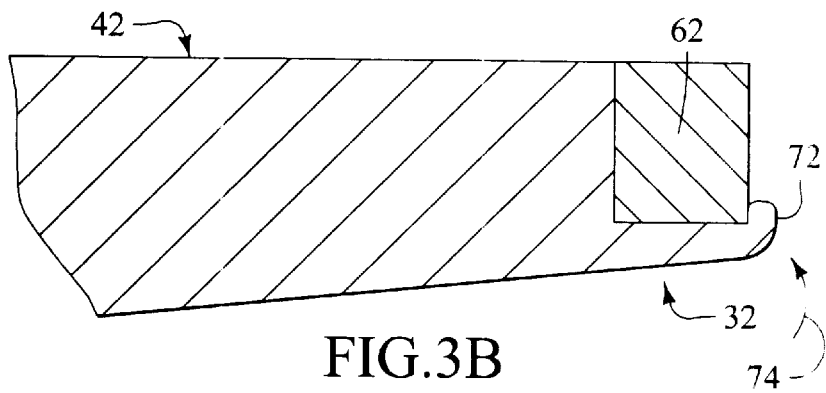
FIG. 3B is a close-up side view of a subflange of an alternate embodiment of the present invention.
Figure 3C:
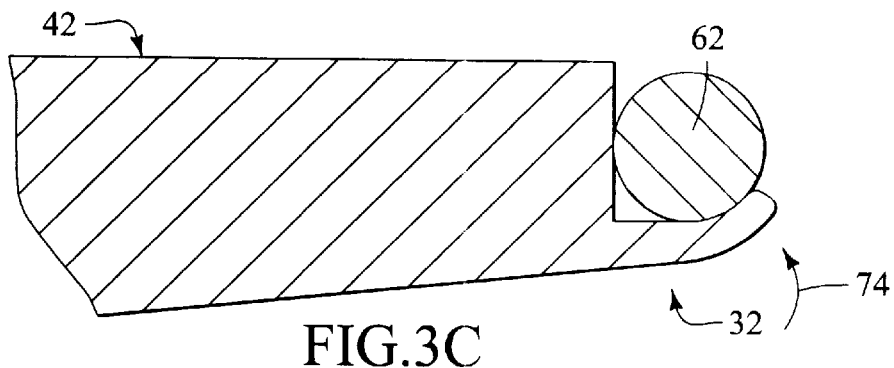
FIG. 3C is a close-up side view of a subflange of an alternate embodiment of the present invention.

In the preferred embodiment of the invention, the ring 62 can be mounted to the pole piece member 18, 20 in a number of different ways, as illustrated in FIGS. 3A, 3B, and 3C. FIG. 3A shows a subflange 32 with a groove 68 defined therein. The ring 62 is removed for clarity in this illustration, but it can easily be seen that the groove 68 is preferably cut so that it is adapted to fit the width of the ring 62. The ring 62 is placed in the groove 68 where it can either be welded, attached with an adhesive, or simply held in place by the protruding vertical portion 70 of the subflange 32. In the alternative, the ring 62 may be sized to "snap" in place by slightly flexing the magnetic poles 30 inwardly and/or stretching the ring 62. The poles 30, since they may be biased toward their resting position, can hold the ring 62 in place.

FIG. 3B shows a ring 62 in its mounted position. In this method, the ring 62 is placed upon the subflange 32. After placement, the protruding portion 72 of the subflange 32 is deformed in a direction 74 such that it locks the ring 62 in place on the subflange 32. FIG. 3C shows a similar method, but demonstrates that the cross section of the ring 62 need not be square. This illustration shows the ring 62 with a circular cross section, but the cross section of the ring 62 may be any shape. The shape of the cross section of the ring 62 will determine the shape of the groove 68 or the amount the protruding portion 72 of the subflange 32 should be deformed.

Figure 3D:
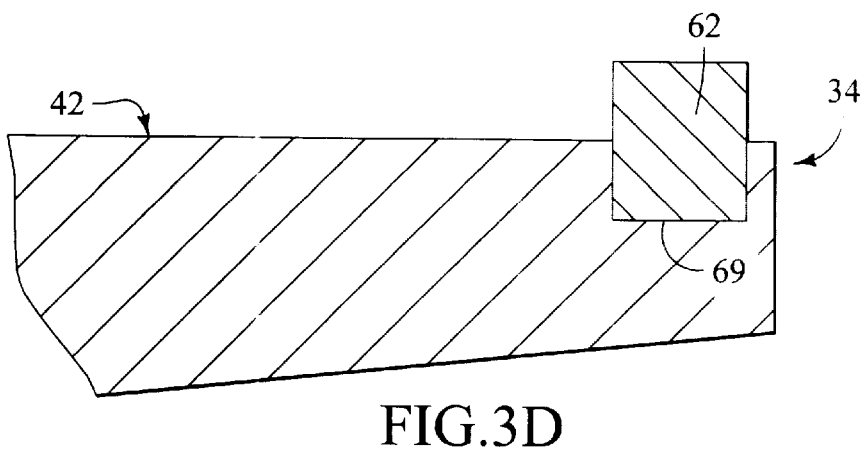
FIG. 3D is a close-up side view of an alternate embodiment of the present invention.

FIG. 3D shows an alternative embodiment of the present invention, wherein the retaining structure takes the form of a groove 69 defined directly upon the distal end 34 of the flanged magnetic pole 30. The ring 62 can be attached to the groove 69 in ways analogous to those described above in conjunction with FIGS. 3A–C. In this embodiment, it is important to note that the ring 62 and the groove 69 are still outside the spatial gap 19 between the rotor 14 and the stator 12.

Figure 10:
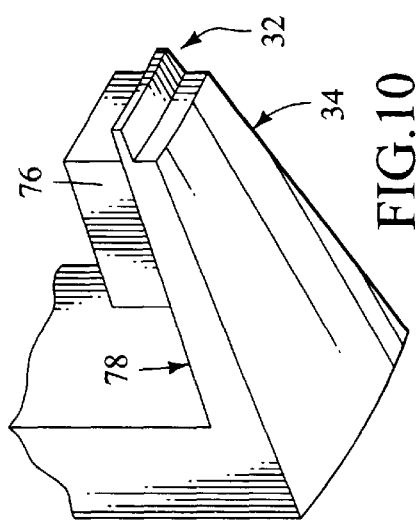
FIG. 10 is an enlarged, perspective view of a flanged magnetic pole of an embodiment of the present invention with an optional permanent magnet in place.

FIG. 7 also shows a second embodiment of the present invention with a plurality of optional permanent magnets 76. These permanent magnets 76 may be positioned under the inner surface 78 of a flanged magnetic pole 30 of either the first pole piece 18 or the second pole piece 20. The permanent magnets 76 are magnetized in a direction such that they prevent flux leakage from the flanged magnetic poles 30 of the first pole piece 18 to the second pole piece 20. FIG. 10 shows an enlarged, perspective view of a flanged magnetic pole 30 with a permanent magnet 76 positioned under the inner surface 78.

Figure 9:
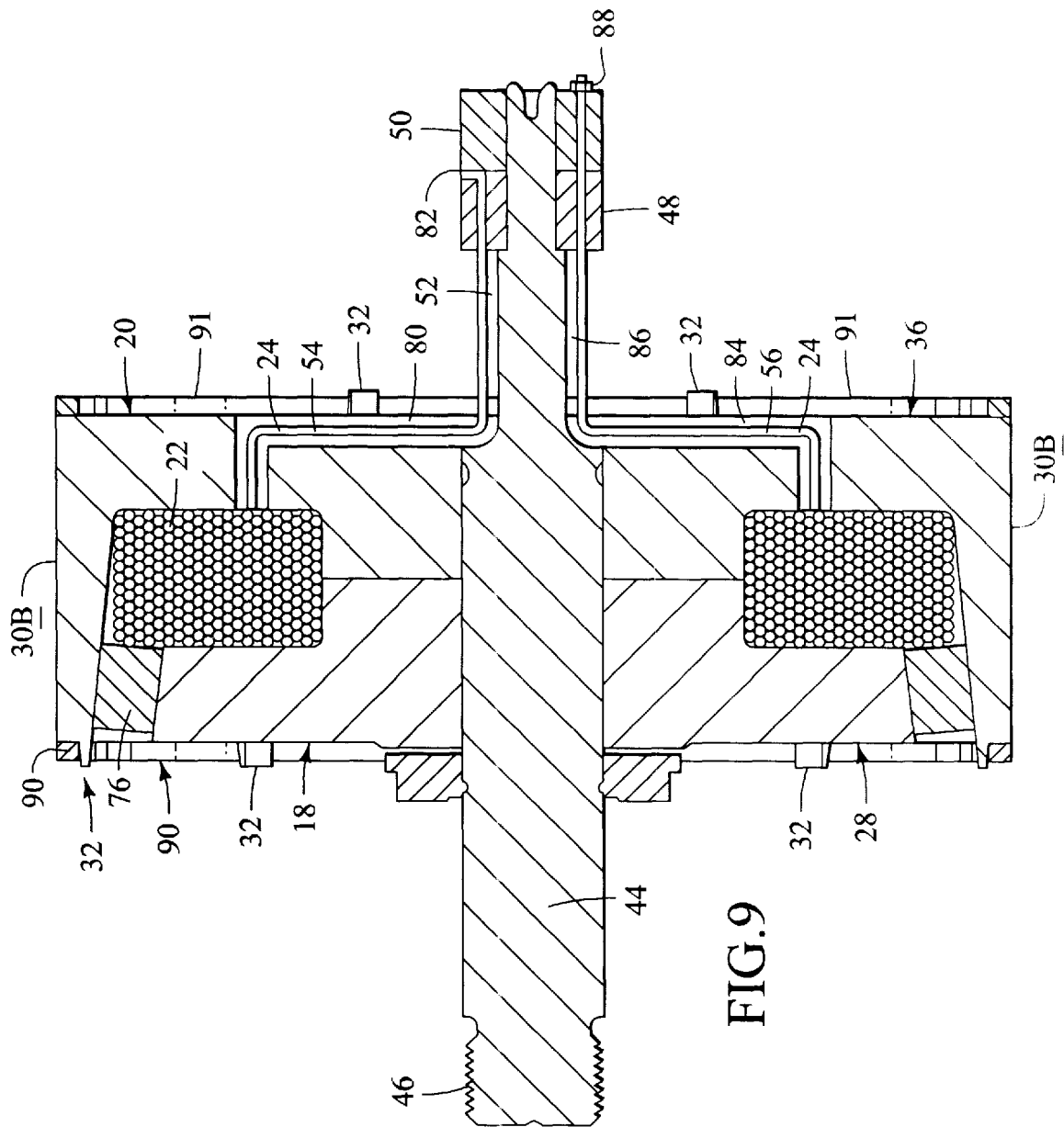
FIG. 9 is a cross-section of an embodiment of the invention showing mounted securing means each touching both pole pieces.
Figure 9A:
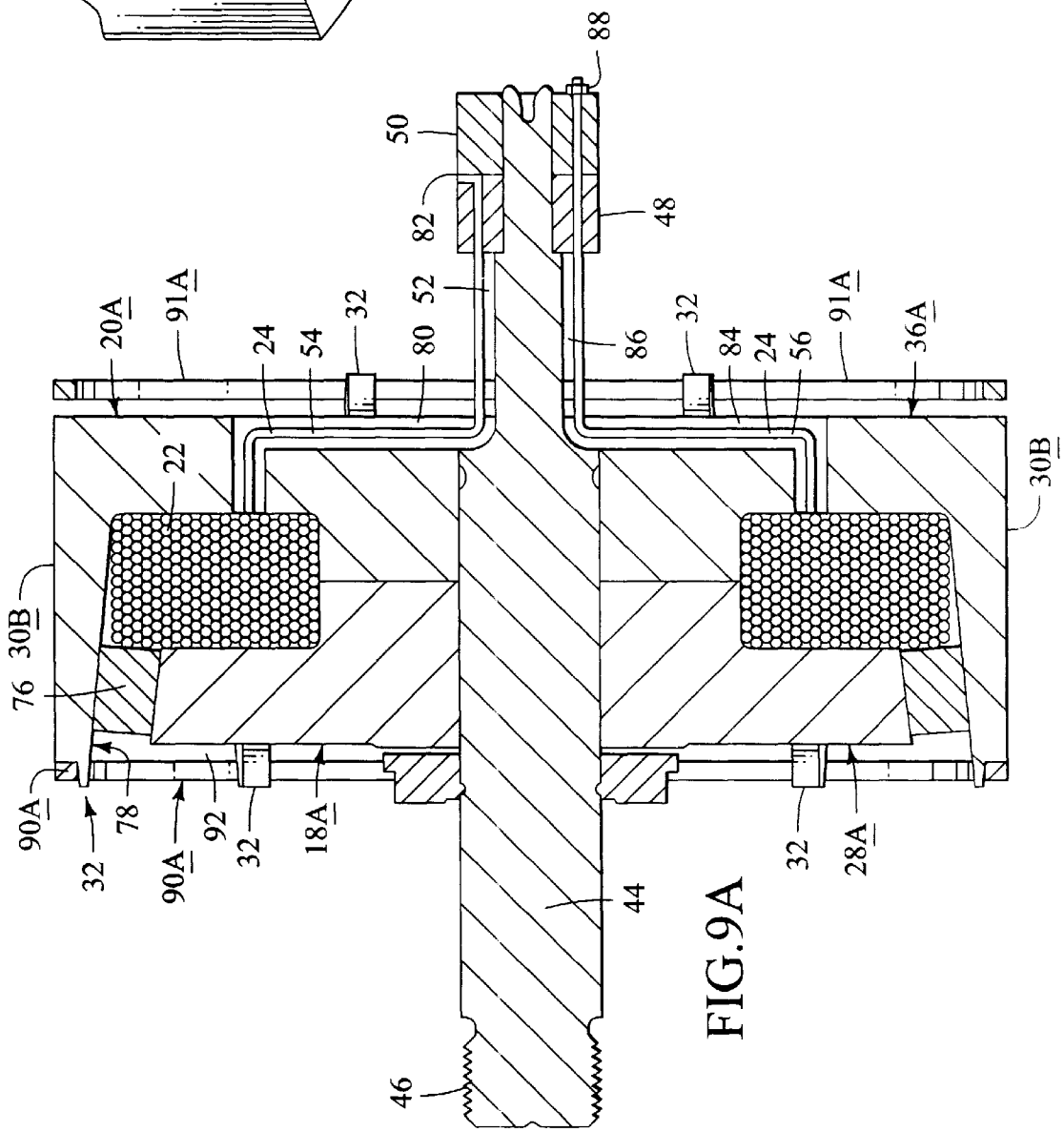
FIG. 9A is a cross-section of the preferred embodiment of the invention showing mounted securing means each touching only one of the pole pieces.

FIGS. 8, 9, and 9A show cross sectional views of different embodiments of the rotor in its assembled state. The first pole piece 30 is meshed with the second pole piece 20 and mounted on a shaft 44. The field coil 22 is preferably encased by the first pole piece 18 and the second pole piece 20. The optional permanent magnets 76 are preferably positioned under the inner surface 78 of the first pole piece 18 and contact the second pole piece 20. In the preferred embodiment of the invention the field coil 22 is made up of one wire 24 with a first end 54 and a second end 56. The first end 54 may run through a groove 80 in the flat base face 36 of the second pole piece 20, continuing through a groove 52 on the shaft 44. The first end 54 can be welded to a first slip ring 48 at a point 82 adjacent to a second slip ring 50. Preferably, the second end 56 may run through a groove 84 in the flat base face 36 of the second pole piece 20, continuing through a groove 86 on the shaft 44. The second end 56 can be welded to the second slip ring 50 at a point 88 farthest from the first slip ring 48. Power is supplied to the field coil 22 through the first end 54 and the second end 56, which creates magnetic flux that passes across the spatial gap 19 and into the stator 12, both of which are shown in FIGS. 11 and 12.

The flanged magnetic poles 30 of the second pole piece 20 are shown in FIG. 8. In the preferred embodiment of the invention, the subflanges 32 are on the distal ends 34 of the flanged magnetic poles 30. FIG. 8 shows the rotor assembly without the securing means in place on the subflanges 32.

FIG. 9 and FIG. 9A show two different configurations of two securing means 90, 91, 90A, 91A in alternative embodiments of the present invention. In FIG. 9, the first securing means 90 is shown in contact with the flat base face 28 of the first pole piece 18. The second securing means 91 is shown in contact with the flat base face 36 of the second pole piece 20. In FIG. 9A, the first securing means 90A is not in contact with the flat base face 28A of the first pole piece 18A, nor is the second securing means 91A in contact with the flat base face 36A of the second pole piece 20A. The securing means 90A and the first pole piece 18A generally define a gap 92 between them. By keeping the first securing means 90A out of contact with the first pole piece 18A and the second securing means 91A out of contact with the second pole piece 20A, this configuration allows for the use of any material in constructing the securing means 90A, 91A, as there is no fear of magnetic flux leakage from the first pole piece 18A through either securing means 90A, 91A to the second pole piece 20A. In the configuration shown in FIG. 9, the securing means 90, 91 must be constructed out of a non-magnetic material to prevent excessive leakage between the securing means 90, 91 and the pole pieces 18, 20. Both configurations allow for the mounting of the securing means 90, 90A, 91, 91A outside of the spatial gap 19 shown in FIGS. 11 and 12. This avoids having to cut a groove in the pole pieces 18, 20 of the rotor 14, which would increase the spatial gap 19 and decrease the output of the electrical machine.

Figure 11:
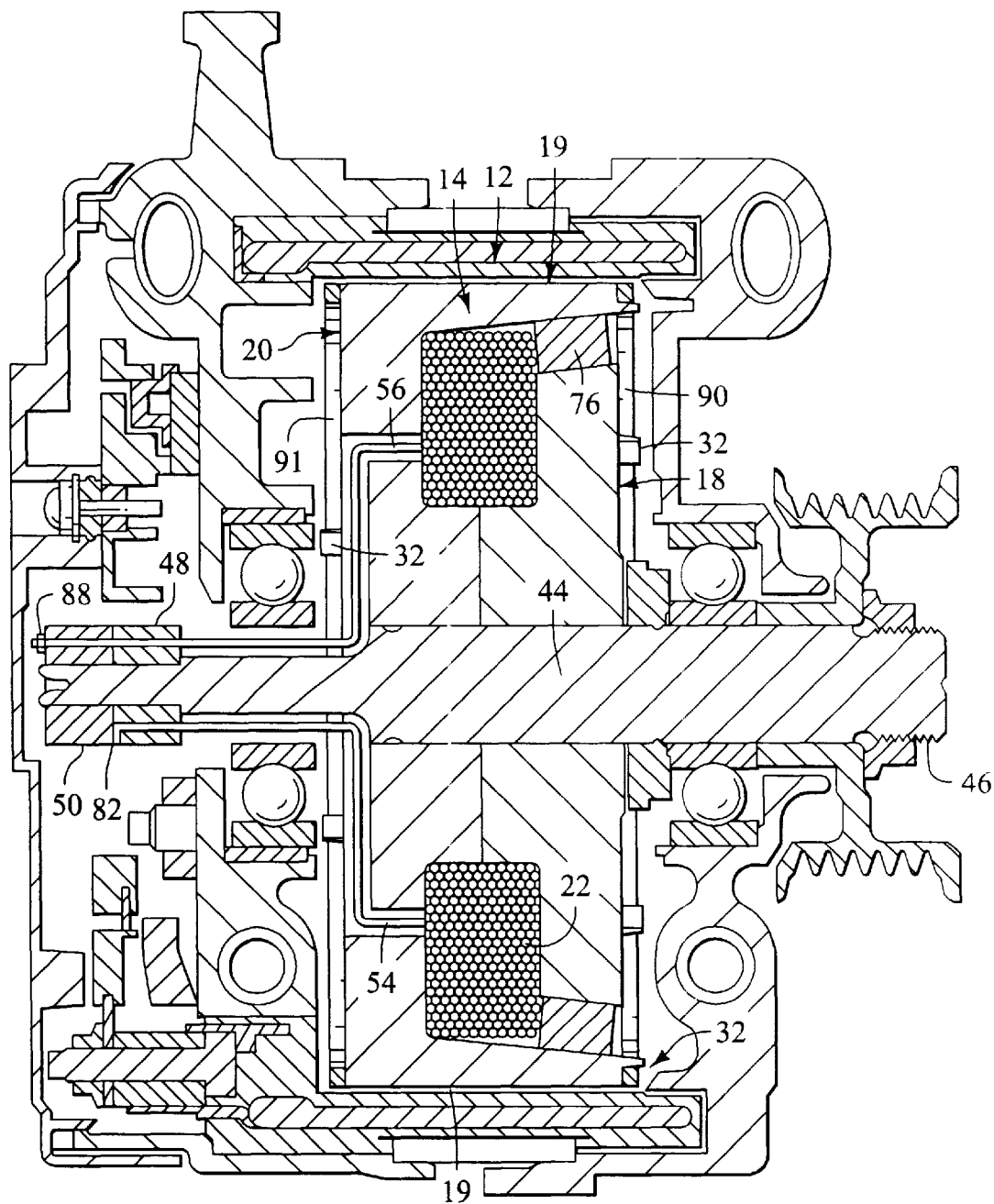
FIG. 11 is a cross-sectional view of an embodiment of the present invention inside a liquid-cooled alternator.
Figure 12:
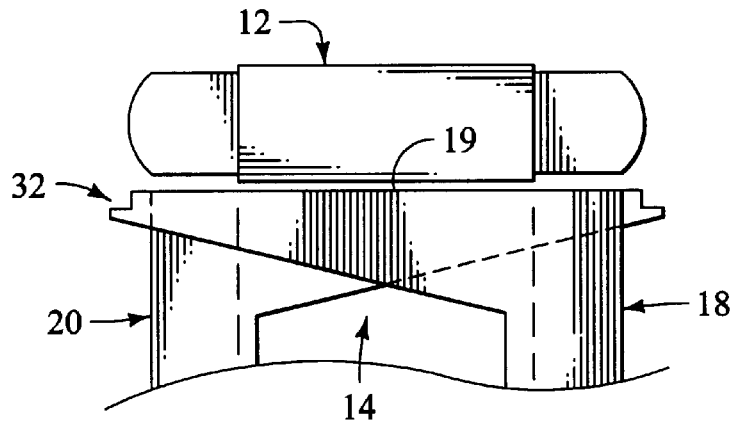
FIG. 12 shows the spatial gap between the rotor and the stator in an embodiment of the present invention.

FIG. 11 shows the rotor assembly embodied within an embodiment of a liquid cooled alternator. Visible in this view are the stator 12 and the spatial gap 19 between the rotor 14 and the stator 12. FIG. 12 shows a close up of the arrangement of the rotor 14 and the stator 12, along with the spatial gap 19 between them. The stator 12 generates alternating current as the rotor 14 rotates.

It should be understood that there are a wide range of changes and modifications that could be made to the embodiment described above. In particular, brackets or fasteners could replace the ring as the securing means, and the retaining structures could take a form other than subflanges, as shown in FIG. 3D. The rotor assembly may be used in a variety of machines other than an electric generator or a liquid cooled alternator. Thus it is intended that the forgoing detailed description be regarded as illustrative rather than limiting and that it be understood that it is the following claims, including all equivalents, which are intended to define the scope of the. invention.

What is claimed is:

1. An axially turnable rotor for an electric generator, said rotor comprising:
    a rotor coil;
    a pole piece assembly made up of a first pole piece member and a second pole piece member, each of said members having flanged magnetic poles alternatively meshed with each other and encasing said rotor coil, at least two of said flanged magnetic poles including a distal end defining a retaining structure thereon, said pole piece members including a base face axially opposite said distal ends; and
    means for securing said flanged magnetic poles via said retaining structures, wherein one of said retaining structures contacts only the first pole piece member and a second of said retaining structures contacts only the second pole piece member.

2. A rotor according to claim 1 wherein said retaining structure further comprises a subflange defined on said distal end of said flanged magnetic poles.

3. A rotor according to claim 2 wherein said subflanges define radially facing stepped portions.

4. A rotor according to claim 3, wherein the means for securing said distal ends of said flanged magnetic poles further comprises a substantially rigid connector contacting said at least two of said distal ends.

5. A rotor according to claim 4, wherein the connecting means further comprises a ring.

6. A rotor according to claim 5, wherein said ring is composed of metal.

7. A rotor according to claim 6, wherein said metal ring is composed of ferro-magnetic material.

8. A rotor according to claim 6, wherein said metal ring is adapted to fit said subflanges on said at least two distal ends.

9. A rotor according to claim 8, wherein a plurality of said rings are placed such that one ring contacts said flanged magnetic poles of only one pole piece member and a second ring contacts only said flanged magnetic poles of said other pole piece member.

10. A rotor according to claim 9, wherein a permanent magnet is positioned under at least one of said flanged magnetic poles.

11. A rotor according to claim 10, wherein said permanent magnet contacts the second pole piece member.

12. A rotor for an electric generator, said rotor comprising:
    a rotor coil;
    a pole piece having flanged magnetic poles encasing said rotor coil, said pole piece member including a base face axially opposite said distal ends;
    at least two of said flanged magnetic poles including a distal end defining a retaining structure thereon; and
    means for securing said flanged magnetic poles via said retaining structures by contacting only one pole piece member.

13. A rotor according to claim 12 wherein said retaining structure further comprises a subflange defined on said distal end of said flanged magnetic poles.

14. A rotor according to claim 13, wherein said subflanges define radially facing stepped portions.

15. A rotor according to claim 14, wherein the means for securing said distal ends of said flanged magnetic poles further comprises a connector contacting said at least two of said distal ends.

16. A rotor according to claim 15, wherein the connecting means further comprises a metal ring.

17. A rotor according to claim 16, wherein said metal ring is composed of ferro-magnetic material.

18. A rotor according to claim 17, wherein said metal ring is adapted to fit said subflanges on said at least two distal ends.

19. An axially turnable rotor assembly for an electric generator, said rotor comprising;
    a rotor coil;
    a pole piece assembly made up of a first pole piece member and a second pole piece member, each of said members having flanged magnetic poles alternatively meshed with each other and encasing said rotor coil; and
    a plurality of magnetic poles on each of said pole piece members rigidly secured to each other with retaining structures at distal ends thereof to prevent radial deformation of said poles during rotation of said rotor, wherein one of said securing retaining contacts only the first pole piece member and a second of said securing retaining contacts only the second pole piece member.

20. The rotor assembly of claim 19 wherein said pole piece members are rigidly secured in position by a securing means, said securing means further comprising a ring.

21. An axially turnable rotor for an electric generator, said rotor comprising:
    a rotor coil;
    a pole piece assembly made up of a first pole piece member and a second pole piece member, each of said members having flanged magnetic poles alternatively meshed with each other and encasing said rotor coil, said pole piece members including a base face axially opposite said distal ends;
    at least two of said flanged magnetic poles including a distal end defining a subflange on said distal end, said subflange defining radially facing stepped portions; and
    a plurality of rigid metal rings adapted to fit said subflanges on at least two distal ends, each contacting at least two of said distal ends of only one pole piece member and not in contact with said flanged magnetic poles of said other pole piece member.

22. A rotor according to claim 21, wherein a permanent magnet is positioned under at least one of said flanged magnetic poles.

23. A rotor according to claim 22, wherein said permanent magnet contacts said second pole piece member.

* * * * *